United States Patent [19]
Taylor et al.

[11] Patent Number: 5,309,462
[45] Date of Patent: May 3, 1994

[54] MAGNETIC SPIKER GAS LASER EXCITATION CIRCUIT

[75] Inventors: Rod S. Taylor, Gloucester; Kurt E. Leopold, Carp, both of Canada

[73] Assignee: National Research Council of Canada, Ottawa, Canada

[21] Appl. No.: 18,553

[22] Filed: Feb. 17, 1993

[51] Int. Cl.⁵ .............................................. H01S 3/00
[52] U.S. Cl. ........................................ 372/38; 372/86; 372/37
[58] Field of Search ...................... 372/37, 38, 86, 87

[56] References Cited

U.S. PATENT DOCUMENTS

| | | | |
|---|---|---|---|
| 4,837,773 | 6/1989 | Wakata et al. | 372/86 |
| 5,090,021 | 2/1992 | Nakatani et al. | 372/86 |
| 5,181,217 | 1/1993 | Sato et al. | 372/86 |

FOREIGN PATENT DOCUMENTS

0408142  1/1991  European Pat. Off. .............. 372/38

Primary Examiner—Léon Scott, Jr.

[57] ABSTRACT

A circuit and method for excitation of electric discharge gas lasers is provided. The circuit includes a pair of electrodes, a main energy storage means for storing electrical energy for the operation of the laser, energy transfer means in the form of saturable inductive elements which are connected in series coupling a terminal of the main energy storage means with one of the electrodes, and for transferring the electrical energy thereto in the form of a discharge voltage pulse. A switching means in series with a secondary energy storage means is connected between the saturable inductive elements and connected in parallel with the main energy storage means and the electrodes. The switching means is operable in one mode to allow the passage of current and operable in another mode to prevent the passage of current across the switching means. The circuit also includes a first preionizer for producing ionizing radiation; and, a second preionizer for producing ionizing radiation. The ionizing radiation from the first preionizer is available to the second preionizer for producing electrons within the second preionizer.

19 Claims, 8 Drawing Sheets

FIG. 1

PRIOR ART

MAGNETIC SPIKER GAS LASER EXCITATION CIRCUIT

FIELD OF THE INVENTION

This invention relates to electrical power delivery systems and more particularly to a circuit and method for excitation of electric discharge gas lasers.

BACKGROUND OF THE INVENTION

High power electric discharge gas lasers can be operated to provide high pulsed output energy. To produce such energy, the gas within the laser is usually excited by means of an intense source of electron excitation, either from a high voltage self sustained electric discharge, or, an electron beam sustained discharge. The excitation of the gas or gases within the laser results in the emission of light energy of the appropriate wave length that can then be collimated as is well known in the art. In practice, the self-sustained electric discharge method is the popular alternative.

To provide a self-sustained discharge in a gas laser, one must first preionize the gas by means of generating a low level of electrons in the discharge gap, then avalanching the low-level ionization to the final level required for breakdown of the gas, and finally excite the gas using sufficient energy to sustain the discharge.

In the past, single, high voltage pulses having fast rise times and a discharge pulse duration in the order of tens to hundreds of nanoseconds or more have been used to avalanche ionize the gas and then to provide the required sustained discharge. Low inductance rail-gap, thyratron and magnetic switches together with pulse forming networks (PFN) have been used to provide such high energy, rapid rise times and long duration pulses. However, in terms of switches, magnetic switching using saturable inductors are preferable as these switches offer long life, reliability, low cost, less complexity, and high repetition rate capability.

U.S. Pat. No. 4,698,518 entitled Magnetically Switched Power Supply System for Lasers in the name of Pacala teaches the use of saturable inductors as switches for compressing the width and sharpening the rise time of pulses from high voltage, high impedance pulse generators to provide the necessary excitation to EDGLs. Taylor (the applicant) et al. in U.S. Pat. No. 4,679,203 teach saturation of a pulse transformer core inductance to efficiently switch a main energy store into the discharge after the breakdown of the laser gas mix has occurred.

The use of magnetic-spiker sustainer excitation circuits in rare gas halide lasers such as XeCl lasers has resulted in more efficient lasers having longer optical pulse duration, and a higher beam quality compared to lasers with conventional electrical discharge excitation circuits. Magnetic-spiker sustainer circuits are currently being investigated for the generation of very high average power (1 kW) XeCl lasers for use in materials processing applications. As well, these circuits are capable of producing microsecond duration optical pulses. Long optical pulse duration provides for an increased number of laser cavity round trips, thereby providing conditions that allow for more direct control on the laser divergence, line width, polarization and level of amplified spontaneous emission. The low peak power associated with long optical pulse operation is advantageous for applications where non linear effects such as material damage must be avoided. One such example is in the medical field of XeCl laser coronary angioplasty, where long optical pulses are used to avoid surface damage to the fiber optic delivery system.

Spiker-sustainer circuits are comprised of two electrical circuits; a spiker circuit generates a fast high voltage pulse to initiate gas breakdown; a main energy storage circuit that is generally charged to a low voltage can be adjusted to ensure good energy transfer into the discharge. In magnetic-spiker circuits, the saturable magnetic material or core provides electrical isolation between the spiker circuit and the main energy storage circuit.

There are three basic modes of operation of magnetic-spiker circuits depending on the magnitude and polarity of the spiker voltage relative to the voltage on the main energy storage. When the polarity of the switched spiker voltage and the main energy storage are the same, the circuits operate in the diode mode. When the polarity of the switched spiker voltage and the main energy storage are opposite, the circuit operates in the switch mode. The overshoot mode is an adaptation of the switch mode. Although fine tuning of circuit parameters is required to obtain optimum laser performance in any of the modes, in some respects, operating in the overshoot has been found to be advantageous. Furthermore, operating in a modified overshoot mode (MOM) which will be described hereafter provides even greater advantages.

STATEMENT OF THE INVENTION

It is an object of the invention to provide a circuit for operation in a modified overshoot mode.

In accordance with the invention there is provided, a circuit for exciting a laser having a chamber for receiving a gas, the chamber having electrodes therein, comprising: main energy storage means for storing electrical energy for the operation of the laser, the main energy storage means having a first terminal and a second terminal; energy transfer means in the form of saturable inductive elements connected in series coupling the first terminal of the main energy storage means with one of the electrodes, and for transferring the electrical energy thereto in the form of a discharge voltage pulse; and, switching means in series with a secondary energy storage means connected between the saturable inductive elements and connected in parallel with the main energy storage means and the electrodes, the switching means operable in one mode to allow the passage of current and operable in another mode to prevent the passage of current across the switching means.

In accordance with the invention there is further provided, an circuit for exciting a laser having a gas chamber for containing a gas mixture and first and second electrodes, comprising: pre-preionization means for preionizing the gas mixture, main energy storage means for storing a sufficient electrical energy for the operation of the laser; energy transfer means in the form of series connected inductive elements for connecting the main storage means and the first electrode in an impedance matching manner for transferring the sufficient electrical energy therebetween in the form of a main discharge voltage pulse;

trigger pulse generating means forming a part of the said main energy storage means and for generating a trigger pulse in response to the main discharge voltage pulse; secondary energy storage means for storing an electrical energy; energy transfer means connected between the secondary energy storage means and the second electrode for transferring electromagnetically the electrical energy therebetween in the form of a high voltage pulse which breaks down the gas mixture, switching means connected between the series connected inductive elements and across the main energy storage means for initiating the energy transfer in response to the trigger pulse, the main discharge pulse being longer in duration than the high voltage pulse, and the two pulses being coincidental for a period of time to produce gas breakdown in the laser and to permit the energy transfer means for transferring the sufficient energy from the main energy storage means to the laser.

In accordance with another aspect of the invention there is provided, a preionization unit comprising: first means for producing ionizing radiation; and, second means for producing ionizing radiation, wherein the ionizing radiation from the first means is available to the second means for producing electrons within the second means.

In accordance with another aspect there is provided, a method of operating a circuit for exciting a laser having electrodes and a gas mixture therebetween, comprising the steps of:

a) generating a voltage across the electrodes having a magnitude of approximately $V_i$ volts which is less than a breakdown voltage of the gas mixture;

b) decreasing the voltage to approximately $V_i-X$ volts, where $V_i-X$ is approximately greater or equal to zero volts;

c) initiating gas breakdown of the gas mixture by generating a voltage of approximately equal to or greater than 2 $V_i$ volts which exceeds the gas breakdown voltage of the gas mixture;

d) storing sufficient energy in a storage means connected across the electrodes to allow a discharge of current across the electrodes during and after gas breakdown;

e) decreasing the voltage across the electrodes to a near steady state voltage of approximately 0.5 Vi sufficient to sustain the discharge across the electrodes during which time current stored in the main energy store is added to the discharge for providing and coincident with a lasing action of the laser.

BRIEF DESCRIPTION OF THE DRAWINGS

FIG. 2b is a prior art circuit for producing the waveform of FIG. 2a;

FIG. 3b is a prior art circuit for producing the waveform of FIG. 3a;

FIG. 4b is a prior art circuit for producing the waveform of FIG. 4a;

DETAILED DESCRIPTION

Figure 1:
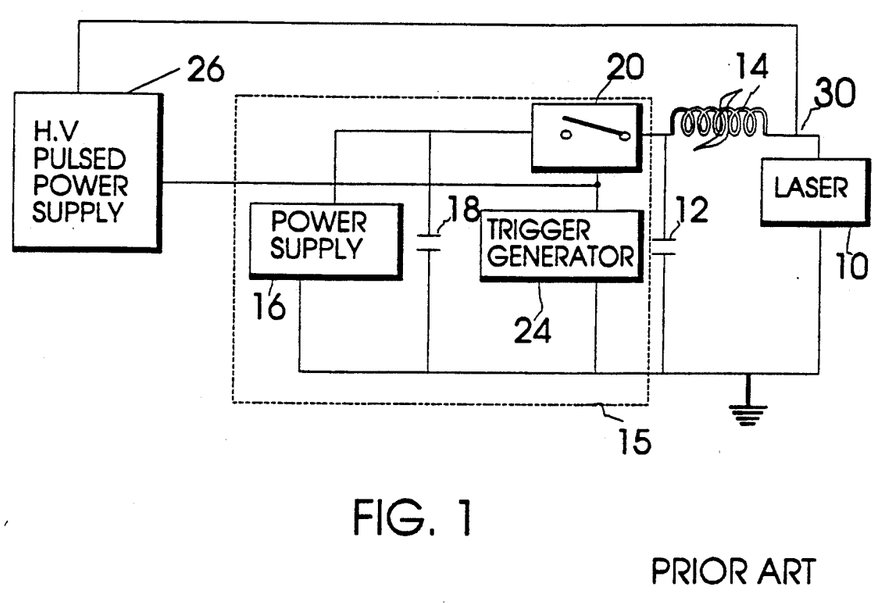
FIG. 1 is a prior art schematic drawing of a power supply system in which two separate pulse sources are utilized to provide the avalanche ionization and sustained discharge pulses for an EDGL.

Referring to FIG. 1, an electric discharge gas laser (EDGL) 10 is connected to a first or main capacitance energy storage device 12, also referred to as a capacitor, through a saturable inductive element 14. The capacitor 12 is preferably in the form of multiple capacitors or distributed capacitance in order to obtain a desired pulse shape. The capacitor 12 is periodically charged from a pulsed high-voltage source 15, which includes a power supply 16, a parallel connected primary capacitor 18, a starting switch 20 and a trigger generator 24. The trigger generator 24 periodically opens and closes the switch 20 at the proper repetition rate (e.g., 250 Hz) to provide the desired pulsed output from the laser 10. The pulsed high-voltage source 15 may include additional pulse forming elements.

The saturable inductive element 14 in its unsaturated state presents a very high impedance to current flow from the capacitor 12 to the laser 10 that functions as a non-conducting open switch. When the voltage across the saturable inductive element 14 reaches a predetermined level, the magnetic material saturates and presents a very low impedance to current flow from the capacitor 12 through the laser 10 that functions as a closed switch. The pulsed high-voltage source 15 is designed to charge the capacitor 12 to a voltage level that is less than that necessary to produce gas breakdown within the laser, but greater (e.g. twice) than the voltage level necessary to provide a sustained discharge within the laser. A high voltage pulse from a power supply 26 is coupled (30) across the laser electrodes 32 to initiate gas breakdown. The trigger generator 24 is also coupled to the high voltage pulsed power supply 26 to synchronize the discharge pulses from the supply 26 with the charge buildup on the capacitor 12.

The saturable inductive element 14 prior to saturation presents a high inductance and a high impedance isolating element to permit the voltage pulse from the high voltage power supply 26 to erect across the laser electrodes 32 rather than charging up the capacitor 12. When the peak voltage across the laser electrodes 32 is sufficient to produce gas breakdown, the impedance between the laser electrodes 32 drops from megohms to ohms or fractions of an ohm.

At the same time that the voltage erects across the electrodes a change in the voltage across the saturable inductive element 14 produces a leakage current through element 14 that results in a decrease in the impedance (inductance) of the inductive element 14 thereby providing a low impedance (inductance) pathway for the transfer of energy from capacitor 12 into the discharge once gas breakdown has occurred.

Figure 2A:
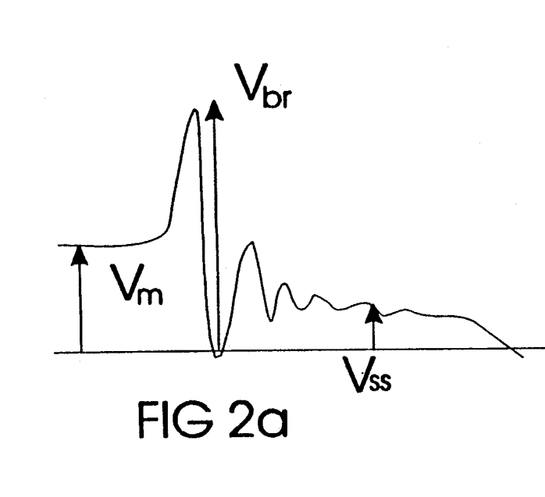
FIG. 2a is a voltage waveform representing the diode mode of operation.
Figure 2B:
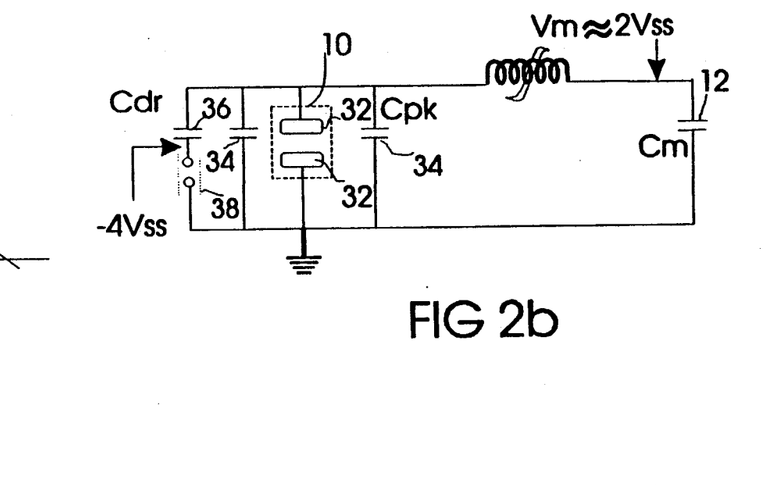
Figure 3A:
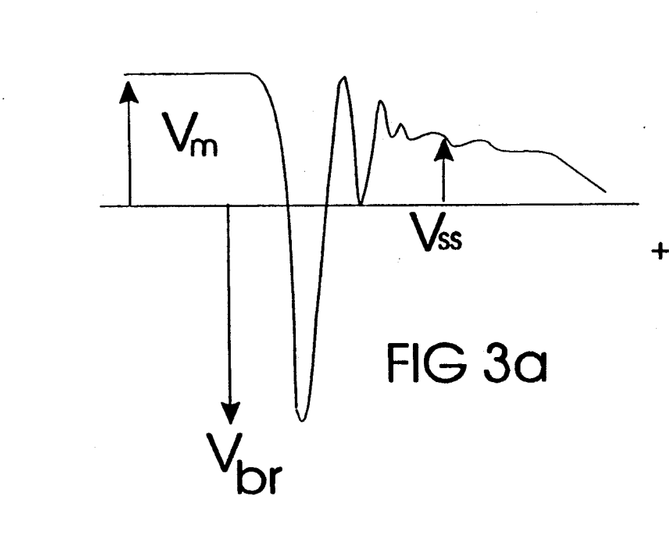
FIG. 3a is a voltage waveform representing the switch mode of operation.
Figure 3B:
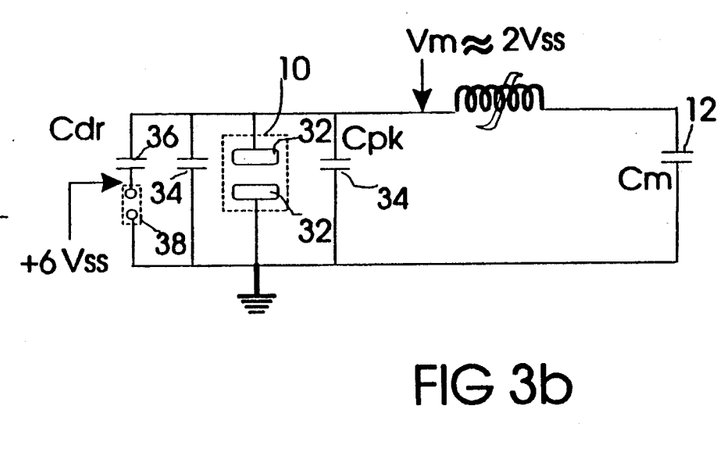
Figure 4A:
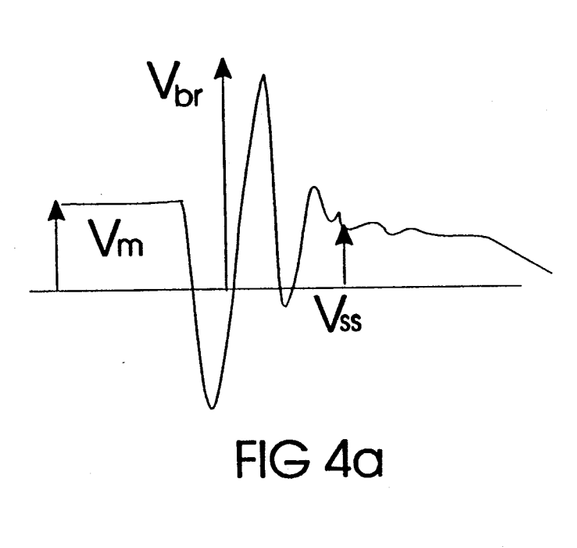
FIG. 4a is a voltage waveform representing the overshoot mode of operation.
Figure 4B:
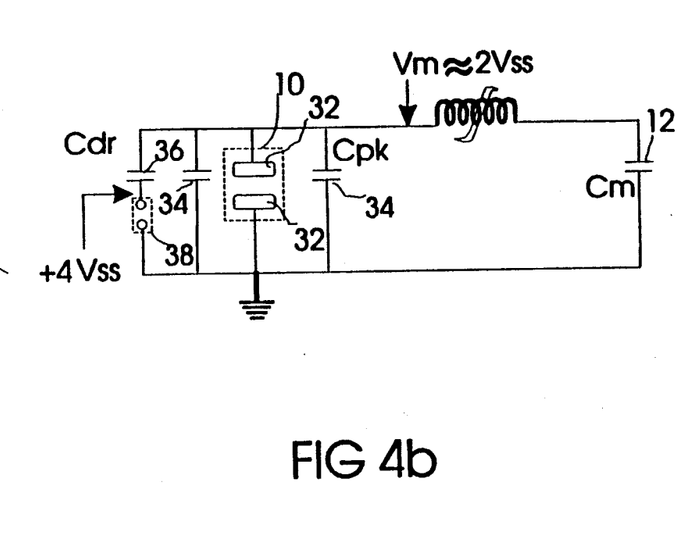

FIGS. 2-4 provide greater detail to the circuit shown in FIG. 1 and outline the three primary modes of magnetic-spiker excitation; in FIGS. 2 to 4 the diode, switch and overshoot modes are shown respectively. The operation of these circuits will briefly be described by way of example with a 3 atmosphere, 3 cm discharge gap, XeCl laser. The power supply 26 that generates the spiker voltage pulse is shown having secondary energy storage means 36 comprising DC or pulse charged capacitors $C_{dr}$ connected in series with a switching element such as a thyratron switch 38 as shown in FIG. 2b. Capacitors 34 ($C_{pk}$) connected across and closely coupled to the electrodes 32 provide a low inductance discharge loop for the rapid transfer of energy from $C_{pk}$ into the discharge gap between the electrodes 32 once gas breakdown has occurred.

When the switched spiker voltage and the voltage on the capacitor 12 that appear across the electrodes 32 are the same polarity, (shown in FIGS. 2a and 2b,) the laser 10 operates in the diode mode. In the example shown, the voltage on the main capacitor energy storage device 12 is positive (typically +10 kV) and the charging voltage $V_{sp}$ of the capacitors 36 is negative (typically −20 kV) which yields a positive spike after firing of the switch 38 in FIG. 2b. The saturable inductive element 14 is reset to a high inductance position when the current charges capacitors $C_{pk}$ 34 through the saturable inductive element 14 during the charge of the main capacitor energy storage device 12 to $V_m$. Near the peak of the PFN charge cycle the spiker thyratron switch 38 is fired and the energy transfer from $C_{dr}$ to $C_{pk}$ results in a voltage increase across the laser electrodes 32 from +10 kV to the gas breakdown voltage $V_{br}$ (typically +25 to +30 kV). Preionization is generally initiated during this phase. Soon after the gas breakdown the voltage polarity across the magnetic material in the saturable inductive element 14 reverses and it is driven into saturation in the opposite direction before the main discharge occurs. However, this is considered to be a drawback of the diode mode of excitation. A full traversal of the B-H loop is required before the inductor goes into saturation resulting in a long time delay of about 200 ns between gas breakdown and the onset of laser emission.

In the switch mode shown in FIG. 3a the spiker voltage $V_{sp}$ is typically +35 kV and the PFN voltage $V_m$ is +10 kV. The saturable inductive element 14 is reset by charging the main capacitor bank 12 (e.g. in 6 microseconds) through the inductive element 14 from the primary capacitor 18. After firing of the spiker thyratron switch 38 the voltage ($V_{br}$) across the electrodes drops to ground potential then negatively below ground potential until reaching the breakdown voltage at which time the peaking capacitors $C_{pk}$ 34 are discharged followed by the main discharge. The inductive element 14 holds off the voltage $|V_{br}|+V_m$ that is higher than in the diode mode case. However, in the switch mode the current through the core is in the same direction right after gas breakdown as it was before, making the time delay between those two discharges relatively short.

Referring to FIG. 4a the overshoot mode is shown. This mode is similar to the switch mode of FIG. 3a however a smaller core area of the inductive element 14 is required as well as a lower spiker voltage. Typically $V_{sp}$ is approximately 20 kV. As in the switch mode, the PFN is charged to $V_m = +10$ kV. The energy transfer from capacitors $C_{dr}$ to $C_{pk}$ drops the voltage across the electrodes 32 to $V_{min}$ ($V_{min} < V_{br}$) at which point the core of the magnetic inductive element 14 begins to saturate. Then the current through the core of the inductive element 14 due to energy transfer between the main energy storage-$C_{pk}$ loop results in further magentic inductive element 14 saturation and a very fast voltage reversal up to $V_{max}$ at which point gas breakdown occurs. This voltage reversal is not only due to a resonant charging of the small peaking capacitors 34 by the large capacitor bank 12 (2 $V_m$ is possible) but it is also necessary to take account of the energy stored in the peaking capacitors at the beginning of the reversal. The ringing between $C_{pk}$ and $C_{dr}$ can assist the voltage reversal to achieve voltages greater than 2 $V_m$ for gas breakdown.

In the overshoot mode the inductive element core 14 hysteresis cycle is traversed in both directions but not completely as in the diode mode. Therefore, the time delay between the spiker discharge and the main discharge can be kept short. Moreover, in addition to requiring a lower $V_{sp}$ and a smaller core area of the inductive element 14, the overshoot mode has the advantage that the voltage at which gas breakdown occurs and the voltage $V_m$ have the same polarity across the electrodes. This can reduce the degree of voltage reversal across the electrodes once gas breakdown has occurred resulting in better discharge stability.

Fine tuning of the circuit parameters is required in all three modes in order to obtain optimum laser performance. Tests have shown that the XeCl laser output energies and laser efficiencies in the overshoot mode and the switch mode are very similar and slightly better than in the diode mode. However, the overshoot mode uses less core area that can lead to faster switching when used with a low inductance laser head. Furthermore, the lower spiker voltage required in the overshoot mode results in optical pulses and main discharge currents with smaller temporal oscillations making it suitable for pulsed repetitive operation.

Figure 5A:
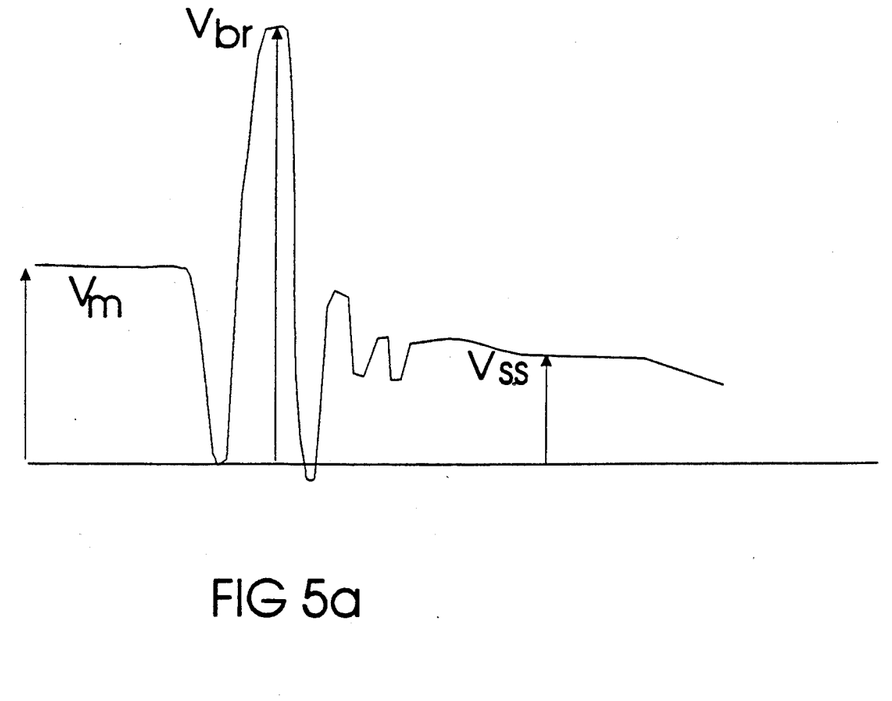
FIG. 5a is a voltage waveform representing the modified overshoot mode of operation in accordance with the invention.
Figure 5B:
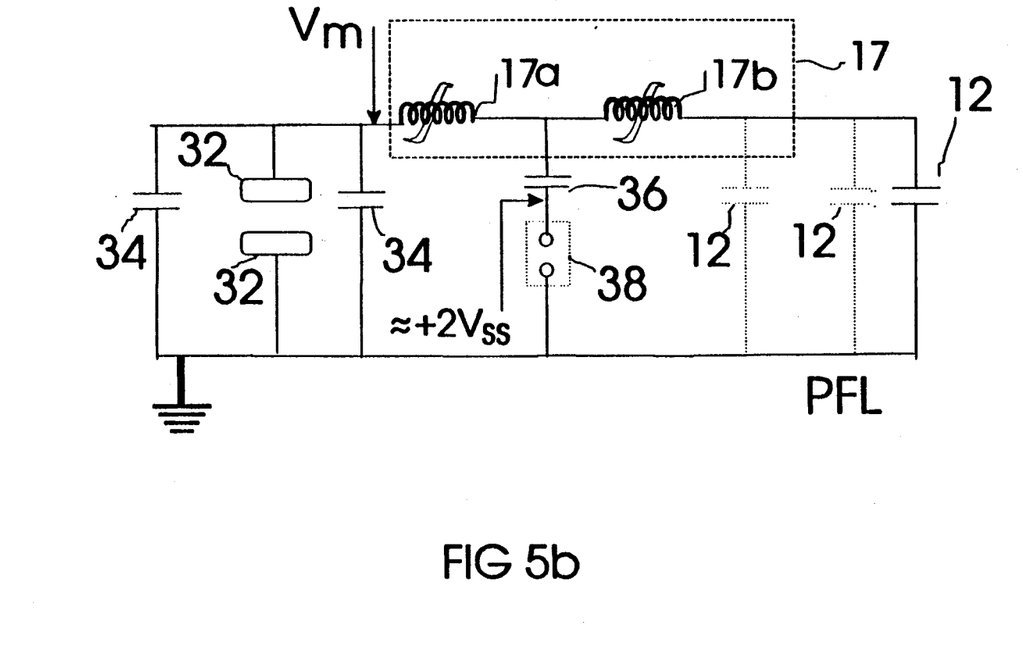
FIG. 5b is a circuit diagram in accordance with the invention which provides . . . improved performance in the modified overshoot mode.

FIG. 5a shows a voltage waveform obtained across the laser electrodes and produced by the circuit shown in FIG. 5b in accordance with the invention that performs in a manner that is preferably to that of the three modes described thus far. The modified overshoot mode offers several advantages that will be described.

In the circuit of FIG. 5b the spiker voltage $V_{sp}$ is reduced to be approximately equal to the voltage ($V_m$) on a main energy storage capacitance 12 such that upon firing of a thyratron spiker circuit switch 38 the voltage $V_m$ that was on peaking capacitors 34 drops to near zero volts with respect to ground potential. The core area of a saturable inductive element 17 is dropped to accommodate the lower spiker voltage V$\Delta$t product and is carefully chosen to saturate when the voltage across the electrodes is near ground potential. At this time, the inductance of the saturable inductive element 17 is sufficiently reduced so that resonant charging of the capacitor $C_{pk}$ 34 occurs through the saturable inductive element 17 from the much larger (greater than 10 times) main energy storage capacitance 12 producing a voltage reversal of magnitude ~2 $V_m$. Preionization is generally timed to occur before this voltage begins to collapse in order to establish a glow discharge. As a means of achieving the maximum possible voltage for gas breakdown for a fixed value of $V_m$ and with $V_{sp} \approx V_m$ the saturable inductive element 17 is split into two inductive elements 17a and 17b. The spiker circuit is connected between the elements 17a and 17b and to ground as shown in FIG. 5b. An alternative arrangement is shown in FIG. 5c where the switching element 38 is connected between the two inductive elements 17a and 17b.

The value of the core area of each inductive element 17a and 17b can be selected for optimum laser performance however, typically the unsaturated inductance of the core with one side attached to one of the laser electrodes is ½ the inductance of the core with one side attached directly to the capacitor 12.

Figure 5C:
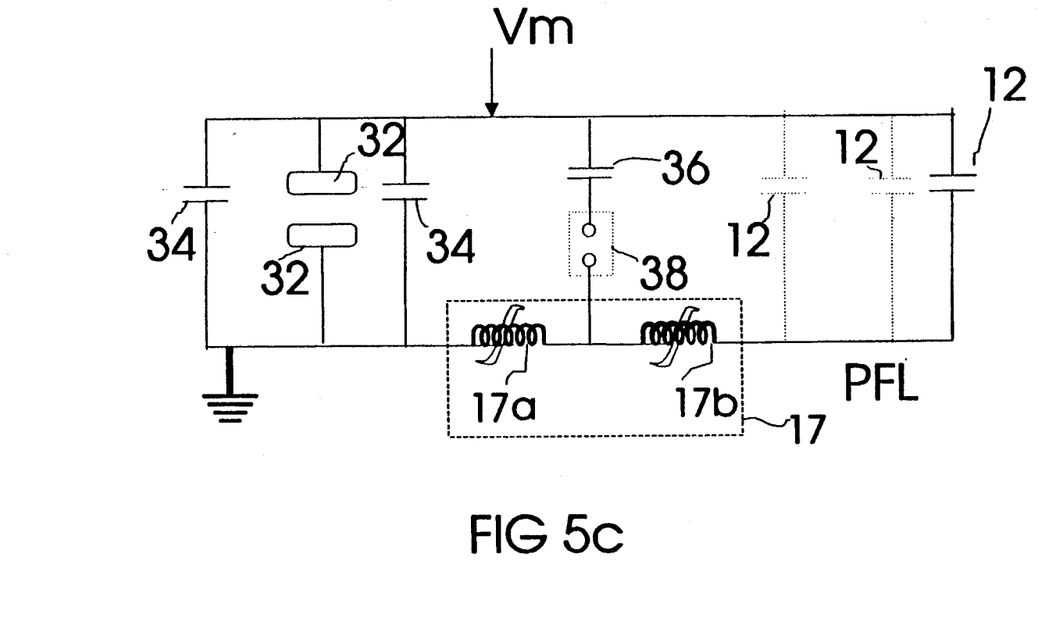
FIG. 5c is an alternative embodiment of the circuit of FIG. 5b.

Advantageously, operating the circuit of FIG. 5b and 5c permits the use of low spiker voltages and low spiker stored energies and consequently lower charge transfer through the spiker switching element 38. The circuit minimizes voltage and current reversals after gas breakdown leading to improved discharge quality and more reliable laser operation. Furthermore, the saturable inductive elements 17a and 17b require less inductor core area which can result in a lower core inductance and/or lower core volume. This can result in faster main discharge current rise times and/or less energy loss in the cores and less cost for the saturable magnetic material.

The use of a split core permits the use of a higher magnetic path length core (due to its usual deployment in a stripline geometry since it is part of the main discharge energy transfer means) for improved isolation of the primary energy storage circuit and the spiker circuit. Furthermore, the spiker circuit of FIG. 5b and 5c can be used to initiate the preionization without requiring the usual use of a step-down transformer to reduce the spiker voltage down to a voltage more acceptable for a corona preionization scheme.

A primary aspect of high pressure gas laser excitation is the means of preionization. Known preionization means which involve the breakdown of a gas volume between two electrodes such as the corona-gap preionization means shown in FIG. 6 can benefit from the use of a second preionization means referred to hereafter as a pre-preionization means to produce a low level of preionization electrons within the main preionization gap to permit a more controlled and uniform breakdown of the corona gap.

Figure 6:
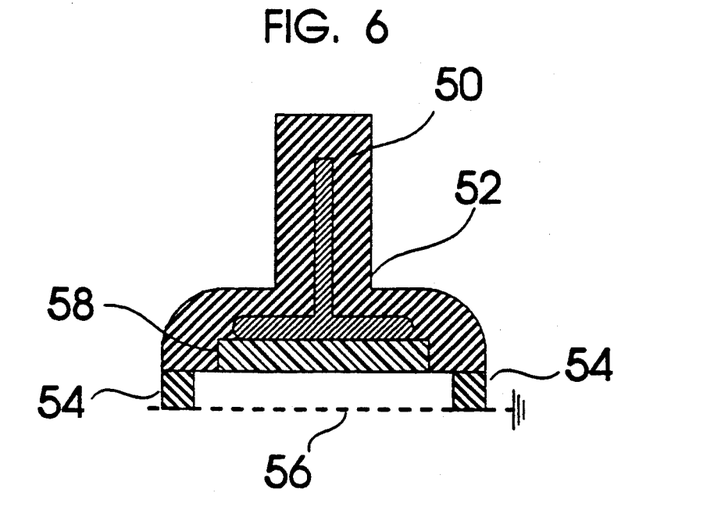
FIG. 6 is a cross sectional view of a corona-gap preionization circuit.

In FIG. 6 a typical arrangement for corona gap preionization of a gas is shown having a fine screen electrode 56. Alternatively, one of the laser electrodes can be used as the screen electrode. The screen electrode 56 is generally maintained at ground potential and forms a gap between a potted dielectric sheet 58 of material such as aluminum oxide by means of electrically insulating supports or spacers 54. When a fast voltage pulse in the range of or less than 100 ns and less or equal to 10 kV in magnitude is applied to a backing electrode 50, shown situated adjacent to and in contact with the dielectric sheet 58, the gas within the gap can be broken down with the subsequent production of ultra violet and vacuum ultra violet (UV−VUV) radiation necessary for the preionization of the main laser discharge volume. Unfortunately for screen to dielectric gaps of 0.5 to a few mm and preionizer lengths of ≧10 cm, gas breakdown in the corona-gap region is usually non-uniform and the jitter in the breakdown relative to the firing of an external low jitter spiker discharge switch (e.g. a thyratron) can be as high as 10–30 ns.

Figure 7A:
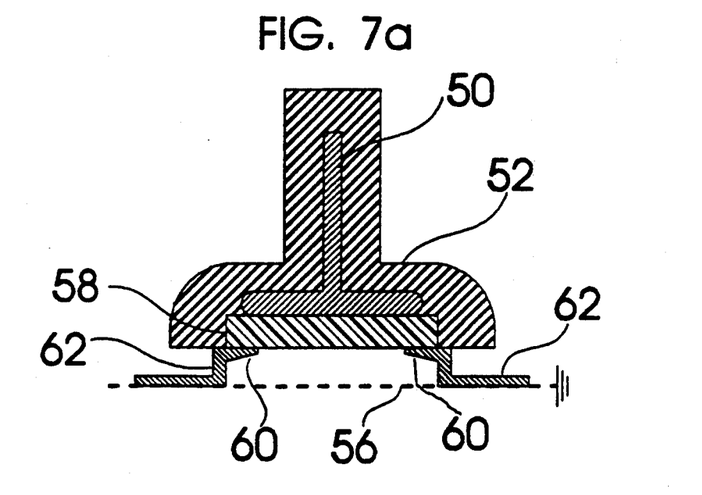
FIG. 7a is a schematic drawing of the cross-section of a hybrid sliding-discharge corona-gap pre-preionization circuit; and, FIG. 7b is an alternative cylindrical geometry for the hybrid sliding-discharge corona gap pre-preionization circuit.

In a preferred arrangement a pre-preionization means can be used to provide UV−VUV radiation or electrons into the space between two electrodes of the main preionization means to ensure a more uniform, low jitter, gas breakdown of the main preionization means. One embodiment of the invention uses sliding discharges on the surface of a solid dielectric material, preferably sapphire, to assist a corona-gap preionization means. This hybrid sliding-discharge corona-gap pre-preionization means is shown in FIG. 7a and operates in the following manner. Electrically conducting spacers in the form of metal spacers 62 are used instead of the insulating spacers 54 shown in FIG. 6 for supporting the screen electrode 56. The conducting elements at the dielectric form two edge electrodes 60 at the end of the spacers 62 which run the length of the preionization device. The gap between the two edge electrodes is generally 10 to 100 times wider than the gap between the screen electrode 56 and the dielectric sheet 58 and is slightly greater than or equal to the active width of the backing electrode 50. As a voltage pulse is applied to the backing electrode 50, multiple filamentary discharges emerge from the high electric field regions at the edges of the edge electrodes 60. UV and VUV radiation or electrons produced by the sliding discharges provide seed electrons into the space or gap between the screen electrode 56 and the dielectric sheet 58. The voltage continues to rise on the backing electrode 50 until at some voltage the preionized gap breaks down. The breakdown of this gap produces UV and VUV radiation or electrons which enter into the space between and including the laser electrodes where they produce a sufficient density of preionization electrons necessary for the uniform breakdown of the main laser gap. It is preferable to limit the extent of the sliding discharges across the dielectric to a few mm to prevent a full sliding discharge from occurring. Such a sliding discharge is spatially less uniform and produces a smaller UV−VUV burst than in the hybrid mode. In addition, the emission source changes both in time and spatially as the discharges grow and finally connect across the dielectric material. The extent of the growth of these uniformly distributed sliding discharges can be controlled by the careful choice of capacitance formed by the edge electrodes 60 and the backing electrode 50. If the capacitance is too high, the sliding discharges can move too far across the gap between the edge electrodes 60. However, if the value of the capacitance is too small, there may not be sufficient growth of the filaments and sufficient UV−VUV radiation produced to initiate a low jitter, uniform breakdown of the corona-gap which automatically shuts off the growth of the sliding discharges.

Figure 7B:
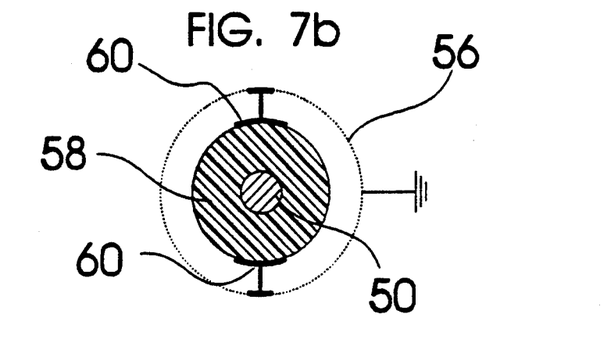

In accordance with this invention, a number of alternative configurations may be envisaged. For example, the voltage pulse can be applied to the screen electrode 56 with the backing electrode 50 held at ground potential. In another embodiment, the geometry of the pre-preionizer could be cylindrical rather than planar such as shown in FIG. 7b. Since the hybrid corona-gap scheme results in both a uniform and precisely timed gas breakdown with a large burst of UV−VUV radiation during the corona-gap breakdown phase, it is an attractive means for use in photo triggered (no spiker circuit) or hybrid magnetic-spiker photo triggered electrical excitation. The latter case could relate to the modified overshoot circuit (FIG. 5a) with a hybrid sliding discharge corona-gap pre-preionization precisely timed to fire just before the peak voltage ($\sim 2\ V_m$) across the laser electrodes. The initiation of the preionization as the voltage of the circuit begins to peak, permits the maximum voltage to be reached before gas breakdown occurs; this results in more uniform discharges. In particular for fluorine based excimer lasers initiation of a fast burst of UV—VUV radiation when the electric field across the electrodes is high maximizes the number of preionization electrons available to ensure a uniform gas discharge.

Numerous other embodiments may be envisaged without departing from the scope of this invention.

What I claim is:

1. A circuit for exciting a laser having a chamber for receiving a gas, the chamber having electrodes therein, comprising:

main energy storage means for storing electrical energy for the operation of the laser, the main energy storage means having a first terminal and a second terminal;

energy transfer means in the form of saturable inductive elements connected in series coupling the first terminal of the main energy storage means with one of the electrodes, and for transferring the electrical energy thereto in the form of a discharge voltage pulse; and, switching means in series with a secondary energy storage means connected between the saturable inductive elements and connected in parallel with the main energy storage means and the electrodes, the switching means operable in one mode to allow the passage of current and operable in another mode to prevent the passage of current across the switching means.

2. The circuit as defined in claim 1 wherein the switching means is for generation of a voltage pulse across the saturable inductive elements for producing a current through the inductive elements for saturating the inductive elements to permit a voltage pulse to be erected across the electrodes for gas breakdown and a discharge and subsequent switching of the main energy storage means through the saturated inductive elements into the discharge.

3. The circuit as defined in claim 1 further comprising energy storage means in parallel with the laser electrodes to provide electrical energy to assist in gas breakdown and to reduce the impedance of the gas after gas breakdown.

4. The circuit as defined in claim 3 wherein the main energy storage means is comprised of a plurality of capacitors connected in parallel.

5. The circuit as defined in claim 4 wherein the energy transfer means comprise two saturable inductive elements.

6. The circuit as defined in claim 5 further comprising a preionizer.

7. The circuit as defined in claim 5 further comprising first means for producing ionizing radiation; and, second means for producing ionizing radiation, wherein the ionizing radiation from the first means is available to the second means for producing electrons within the second means.

8. An circuit as defined in claim 1 further, comprising: pre-preionization means for preionizing the gas mixture, main energy storage means for storing a sufficient electrical energy for the operation of the laser.

9. The circuit as defined in claim 1 further comprising a preionization unit including:
   first means for producing ionizing radiation; and,
   second means for producing ionizing radiation, wherein the ionizing radiation from the first means is available to the second means for producing electrons within the second means.

10. The preionization unit as defined in claim 9 wherein the second means further comprises a means for producing electrons when the ionizing radiation produced by the first preionization means irradiates electrodes forming the second means or a space between the electrodes.

11. The preionization unit as defined in claim 10 wherein the space between the electrodes forming the second means contains dielectric material.

12. The preionization unit as defined in claim 11 wherein one of the electrodes is comprised of a material having a plurality of openings defined therein to allow a gas to pass therethrough.

13. The preionization unit as defined in claim 12 wherein the electrode having a plurality of openings is a preionization screen electrode including at least one edge electrode next to a solid dielectric material.

14. The preionization unit as defined in claim 12 including a pair of edge electrodes contacting a solid dielectric material.

15. The preionization unit as defined in claim 12 wherein the electrode having a plurality of openings is a preionization screen electrode including a pair of edge electrodes contacting a solid dielectric material.

16. The preionization unit as defined in claim 15 wherein the edge electrodes are separated by a distance approximately equal to the electric field generating width of an other of the electrodes contacting the dielectric material.

17. The preionization unit as defined in claim 15 wherein the solid dielectric material is sapphire.

18. A method of operating a circuit for exciting a laser having electrodes and a gas mixture therebetween, the circuit having a preionization unit including first means for producing ionizing radiation; and second means for producing ionizing radiation, wherein the ionizing radiation from the first means is available to the second means for producing electrons within the second means, the method comprising the steps of:

a) generating a voltage across the electrodes having a magnitude of approximately $V_i$ volts which is less than a breakdown voltage of the gas mixture;

b) decreasing the voltage to approximately $V_i-X$ volts, where $V_i-X$ is approximately greater or equal to zero volts;

c) initiating gas breakdown of the gas mixture by generating a voltage of approximately equal to or greater than $2 V_i$ volts which exceeds the gas breakdown voltage of the gas mixture;

d) storing sufficient energy in a storage means connected across the electrodes to allow a discharge of current across the electrodes during and after gas breakdown;

c) decreasing the voltage across the electrodes to a near steady state voltage of approximately $0.5 V_i$ sufficient to sustain the discharge across the electrodes during which time current stored in the main energy store is added to the discharge for providing and coincident with a lasing action of the laser.

19. A method of operating a circuit for exciting a laser having electrodes and a gas mixture therebetween, the circuit having a chamber for receiving the gas; main energy storage means for storing electrical energy for the operation of the laser, the main energy storage means having a first terminal and a second terminal; energy transfer means in the form of saturable inductive elements connected in series coupling the first terminal of the main energy storage means with one of the electrodes, and for transferring the electrical energy thereto in the form of a discharge voltage pulse; the method comprising the steps of:

a) generating a voltage across the electrodes having a magnitude of approximately $V_i$ volts which is less than a breakdown voltage of the gas mixture;

b) decreasing the voltage to approximately $V_i-X$ volts, where $V_i-X$ is approximately greater or equal to zero volts;

c) initiating gas breakdown of the gas mixture by generating a voltage of approximately equal to or greater than 2 $V_i$ volts which exceeds the gas breakdown voltage of the gas mixture;

d) storing sufficient energy in the main energy storage means connected across the electrodes to allow a discharge of current across the electrodes during and after gas breakdown;

c) decreasing the voltage across the electrodes to a near steady state voltage of approximately 0.5 $V_i$ sufficient to sustain the discharge across the electrodes during which time current stored in the main energy store is added to the discharge for providing and coincident with a lasing action of the laser.

* * * * *